Oct. 17, 1961 J. R. DVORAK 3,004,458
HYDRAULIC POWERED OSCILLATING SHEAR
Filed June 3, 1955 2 Sheets-Sheet 1

INVENTOR.
JOE R. DVORAK
BY
Patrick D. Beavers
ATTORNEY

Oct. 17, 1961    J. R. DVORAK    3,004,458
HYDRAULIC POWERED OSCILLATING SHEAR
Filed June 3, 1955    2 Sheets-Sheet 2
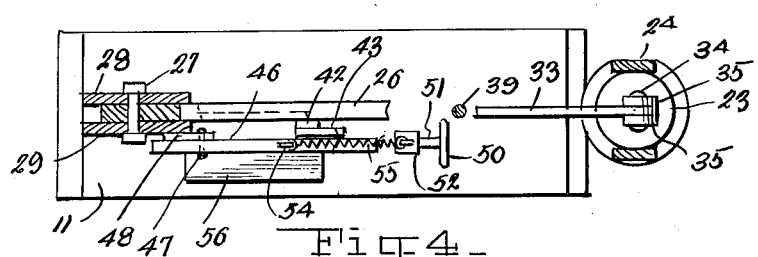
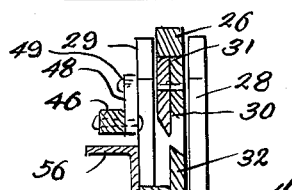
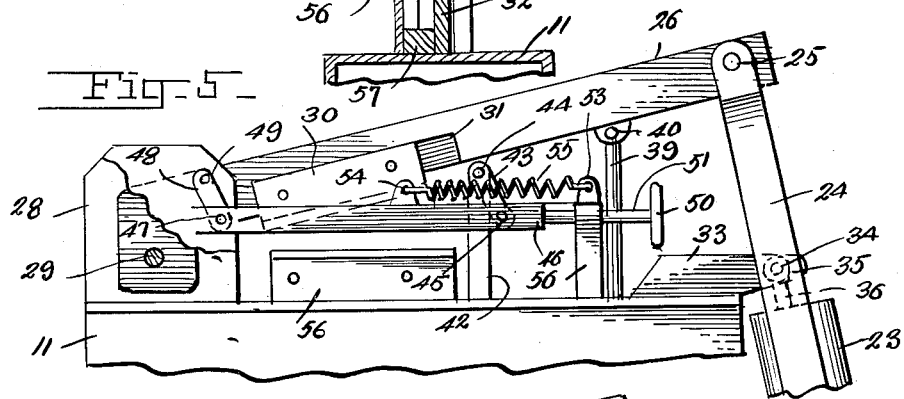
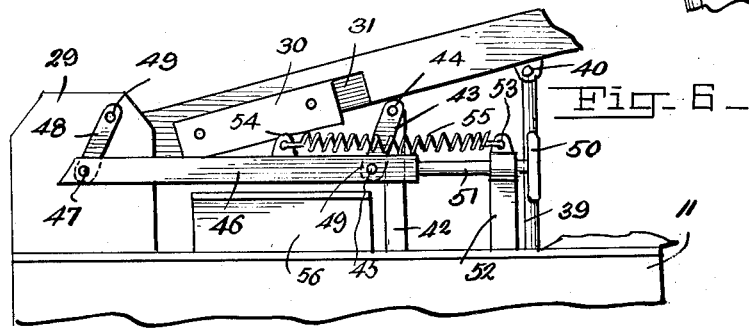
INVENTOR.
JOE R. DVORAK
BY
Patrick D. Beaver
ATTORNEY

United States Patent Office 3,004,458
Patented Oct. 17, 1961

3,004,458
HYDRAULIC POWERED OSCILLATING SHEAR
Joe R. Dvorak, Cosmos, Minn.
Filed June 3, 1955, Ser. No. 512,950
2 Claims. (Cl. 83—601)

This invention relates to improvements in shearing apparatus and more particularly to a hydraulically operated shearing apparatus for cutting steel plates and bars.

An object of this invention is to provide a shearing apparatus that will cut plates of maximum capacity to bars of minimum capacity depending on the size of the apparatus.

Another object of the invention is to make a clean cut of the steel plate without the curling of the steel plate as is common at the present time.

With the above and other objects and advantages in view the invention consists of the novel details of construction, arrangement and combination of parts more fully hereinafter described, claimed and illustrated in the accompanying drawings in which:

FIG. 3 is a longitudinal sectional plan view on the line 3—3 of FIG. 2;

FIG. 4 is a vertical sectional view on the line 4—4 of FIG. 1;

FIG. 5 is an enlarged detailed fragmentary view, partly in section, of the work holder in retracted position; and FIG. 6 is a similar view with the work holder in projected position.

Figure 1:
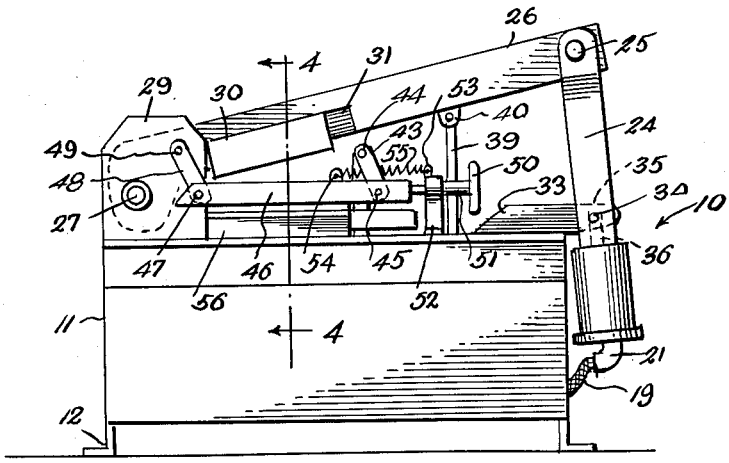
FIG. 1 is a side elevational view of a shearing apparatus embodying the invention.

Referring more in detail to the drawings wherein like parts are designated by like reference numerals a shearing apparatus embodying the invention is generally designated by the reference numeral 10.

The shearing apparatus 10 comprises a rectangular shaped box-like housing 11, having angle iron feet 12 at the four corners thereof.

A shelf 13 is secured to the inner surface of the housing 11 by means of flanges 14.

The shelf 13 supports thereon an electric motor 15 which by means of a belt drive 16 operates a hydraulic pump 17 which is also mounted on the shelf 13.

A rigid conduit 18 extends outwardly of one end of the housing 11 and is connected to a flexible conduit 19 by means of a coupling 20.

The flexible conduit 19 by means of an elbow 21 is connected to the port 22 of a hydraulic cylinder 23. The cylinder 23 being mounted on yoke 24 which is pivotally connected at 25 to one end of a shearing arm 26.

The shearing arm 26 at the opposite end is pivotally connected at 27 within a pair of vertically disposed plates 28 and 29 respectively. The plates 28 and 29 being rigidly secured to the top of the housing 11.

The shearing arm 26 has a shearing blade 30 secured thereto in a recess 31 in the shearing arm 26 and a complementary shaped shearing blade 32 is positioned on the top of the housing 11 to conform with the shearing blade 30 on the shearing arm 26.

A bar 33 is fixed to the top of the housing 11 so that it extends outwardly of the table intermediate of the yoke 24. The outer end of the bar 33 is pivoted at 34 to the bifurcated end 35 of a piston stem 36 of a piston 37 that is mounted in the cylinder 23.

In the operation of the arm 26 the piston 37 remains stationary and the shearing arm 26 is pulled down by movement of the cylinder 23.

Figure 2:
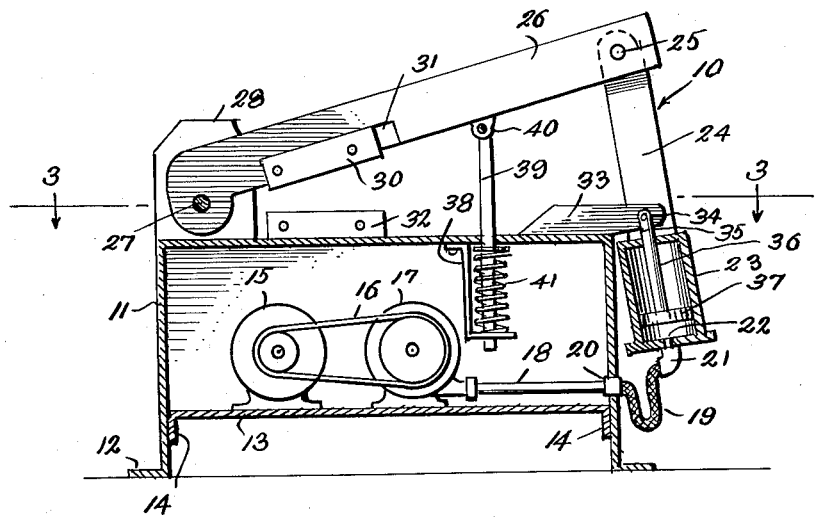
FIG. 2 is a longitudinal sectional view, partly in elevation, of FIG. 1.

An L-shaped bracket 38 within the housing 11 supports a vertically disposed rod 39 which at its upper end is pivotally connected at 40 to the arm 26. A coil spring 41 circumjacent to the rod 39 and connected thereto urges the arm 26 upwardly to the position shown in FIGS. 1 and 2.

A bracket 42 is positioned on the top of the housing 11 in vertical relation thereto at one end of the shearing blade 32. A link 43 is pivoted at one end at 44 to the upper end of the bracket 42 and the opposite end is pivoted at 45 to the work holding bar 46.

The bar 46 is also pivoted at 47 to a second link 48 which is pivoted at 49 to the plate 29 that is mounted on the top of the housing 11.

A hand wheel 50 is connected to one end of a pressure screw 51 which is mounted in a bearing 52 mounted on the top of the housing 11 in vertical relation thereto. The free end of the screw 51 abuts the end of the bar 46 so that as the screw 51 is advanced by rotation of the hand wheel 50 the bar 46 will be moved from the position shown in FIG. 5 to the position shown in FIG. 6.

A vertically disposed apertured projection 53 is provided on the top of the bearing 52 and a similar apertured projection 54 is provided on the bar 46. A coil spring 55 is connected at its opposite ends to the projections 53 and 54 so that as the hand wheel 50 is rotated counter-clockwise the bar 46 will be moved from the position shown in FIG. 6 to the position shown in FIG. 5. The bar 46 coacts with an L-shaped table 56 which is mounted on the top of the housing 11 and spaced from the shearing blade 32 by means of a spacer bar 57, it being noted in FIG. 4 that both the blade 32 and table 56 are secured to the spacer bar 57.

In the operation of the device, work to be sheared is placed on the table 56 and the hand wheel 50 is rotated clockwise until the bar 46 engages the work and firmly retains it on the table 56 during the shearing operation.

Hand or foot controls for the controlling of the electric motor 15 will be provided so that when the motor is energized, it will operate the hydraulic pump 17 causing fluid to be forced into the cylinder 23. As the pressure of fluid within the cylinder 23 increases, the cylinder 23 will be forced downwardly, thereby pulling the shearing arm 26 downwardly so that the work positioned on the table 56 will be sheared by the shearing blades 30 and 32 respectively.

The apparatus can be made of any desired size with the power of the motor and pump being increased as will be necessitated by heavier and larger work.

While the device embodying this invention has been described as a shear the device can be converted to perform other operations that would necessitate a structure of this character.

It is believed that from the foregoing description the operation and construction of the apparatus will be apparent to those skilled in the art and it is to be understood that changes may be made in the minor details of construction, arrangement and combination of parts without departing from the spirit of the invention and the scope of the appended claims.

Having thus described the invention what is claimed as new and desired to be secured by Letters Patent is:

1. A shearing apparatus comprising a support, a fixed shearing blade on said support, a pivoted arm having one end pivotally supported on said support for movement substantially in a plane through an edge of said fixed blade from a position angularly related to said fixed blade to side by side relation thereto, a movable blade on said arm intermediate its ends and cooperable with said fixed blade, a piston rod pivotally connected to said support substantially in said plane and at a point adjacent to said pivotal arm when said movable blade is in side by side relation to said fixed blade, said piston rod extending from its pivot in a direction away from the other end of said pivotal arm, a piston on said rod, a cylinder encircling said piston with said rod extending through one end of said cylinder, said cylinder having a closed other end, a fluid pressure supply connected to said closed other end, and means on said cylinder pivotally connected to the other end of said pivoted arm, said last named means including a pair of spaced arms forming a yoke fixedly secured to diametrically opposed sides of said cylinder and extending longitudinally therefrom parallel to, and on opposite sides of said piston rod and extending beyond the pivotal connection between said piston rod and said support, and a pivot connecting said spaced arm on an axis intersecting said cylinder axis, said last named pivot extending through said plane.

2. A shearing apparatus comprising a support, a fixed shearing blade on said support, a pivoted arm having one end pivotally supported on said support for movement substantially in a plane through an edge of said fixed blade from a position angularly related to said fixed blade to side by side relation thereto, a movable blade on said arm intermediate its ends and cooperable with said fixed blade, a piston rod pivotally connected to said support substantially in said plane and at a point adjacent to said pivotal arm when said movable blade is in side by side relation to said fixed blade, said piston rod extending from its pivot in a direction away from the other end of said pivotal arm, a piston on said rod, a cylinder encircling said piston with said rod extending through one end of said cylinder, said cylinder having a closed other end, a fluid pressure supply connected to said closed other end, and means on said cylinder pivotally connected to the other end of said pivoted arm, said last named means including a yoke fixedly secured to said cylinder to extend longitudinally thereof on opposite sides of said cylinder, said yoke extending parallel to said piston rod and extending beyond the pivotal connection between said piston rod and said support for connection with said pivoted arm, and pivot means connecting said yoke to said other end of said pivoted arm on an axis intersecting said cylinder axis and extending through said plane.

References Cited in the file of this patent
UNITED STATES PATENTS

| | | |
|---|---|---|
| 760,151 | Roberts | May 17, 1904 |
| 775,515 | Boddy | Nov. 22, 1904 |
| 1,274,617 | Smiley | Aug. 6, 1918 |
| 1,729,076 | Laycock | Sept. 24, 1929 |
| 2,243,205 | Hall | May 27, 1941 |
| 2,356,841 | Gregory | Aug. 29, 1944 |
| 2,633,197 | Nischan | Mar. 31, 1953 |
| 2,780,285 | Hudson | Feb. 5, 1957 |